United States Patent
Jax

(10) Patent No.: US 6,898,962 B2
(45) Date of Patent: May 31, 2005

(54) DEVICE FOR LEAKAGE DETECTION AND LEAKAGE LOCATION

(75) Inventor: Peter Jax, Erlangen (DE)

(73) Assignee: Framatome ANP GmbH, Erlangen (DE)

( * ) Notice: Subject to any disclaimer, the term of this patent is extended or adjusted under 35 U.S.C. 154(b) by 0 days.

(21) Appl. No.: 10/461,819

(22) Filed: Jun. 6, 2003

(65) Prior Publication Data

US 2003/0213284 A1 Nov. 20, 2003

Related U.S. Application Data

(63) Continuation of application No. PCT/EP01/14309, filed on Dec. 6, 2001.

(30) Foreign Application Priority Data

Dec. 6, 2000 (DE) .......................................... 100 60 976

(51) Int. Cl.[7] .............................................. G01M 3/04
(52) U.S. Cl. .............................. 73/40; 73/40.7; 73/40.5
(58) Field of Search .......................... 73/40, 40.7, 40.5; 33/40.5

(56) References Cited

U.S. PATENT DOCUMENTS

| 3,977,233 | A | * | 8/1976 | Issel ........................ 73/40.5 R |
| 3,977,956 | A | * | 8/1976 | Bagnulo ................. 204/196.33 |
| 5,215,409 | A | * | 6/1993 | Jax et al. .................. 405/129.5 |
| 5,271,901 | A | * | 12/1993 | Issel et al. ..................... 73/40.7 |
| 5,992,217 | A |   | 11/1999 | Jax et al. |
| 6,088,417 | A | * | 7/2000 | Jax et al. .................. 73/863.23 |
| 6,171,025 | B1 | * | 1/2001 | Langner et al. .......... 73/40.5 R |

FOREIGN PATENT DOCUMENTS

| DE | 2431907 | 7/1977 |
| DE | 4125373 A1 | 2/1993 |
| DE | 4125739 A1 | 2/1993 |
| DE | 19617359 A1 | 11/1997 |
| EP | 0525594 A1 | 2/1993 |
| FR | 7520524 | 1/1976 |

* cited by examiner

Primary Examiner—Hezron Williams
Assistant Examiner—André K. Jackson
(74) Attorney, Agent, or Firm—Laurence A. Greenberg; Werner H. Stemer; Ralph E. Locher

(57) ABSTRACT

A device for identifying and locating leaks has a permeable collecting line, a pump provided for pumping a transport medium through the line, and at least one sensor for detecting a substance that escapes in the event of a leakage. There are provided sources of a detectable gas, which, as waypoints, are located at a distance from one another at known locations along the collecting line. A sensor for detecting the gas is spatially assigned to each sensor that is provided for detecting the escaping substance.

10 Claims, 1 Drawing Sheet

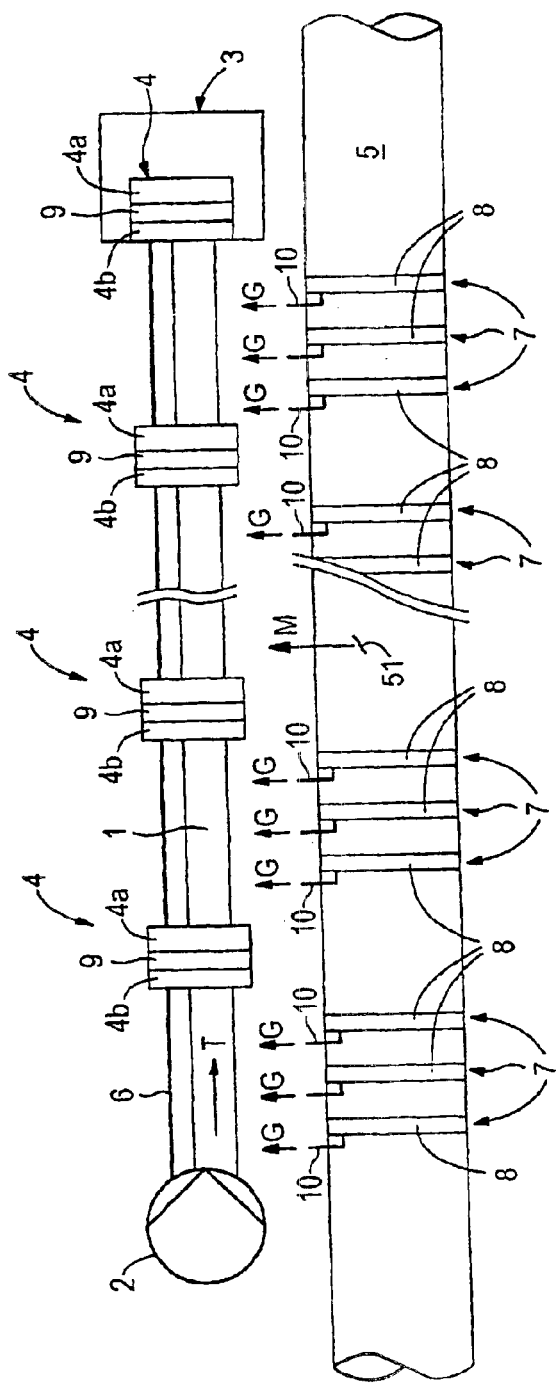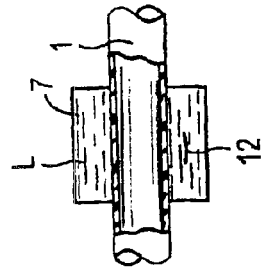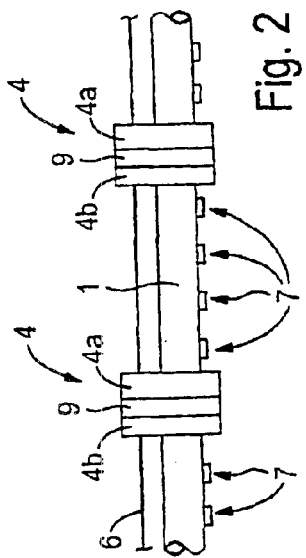

DEVICE FOR LEAKAGE DETECTION AND LEAKAGE LOCATION

CROSS-REFERENCE TO RELATED APPLICATION

This application is a continuation of copending International Application No. PCT/EP01/14309, filed Dec. 6, 2001, which designated the United States and which was not published in English.

BACKGROUND OF THE INVENTION

Field of the Invention

The invention relates to a device for leakage detection and leakage location, with a permeable collecting line which is connected to a pump for a transport medium and to at least one sensor for a substance emerging in the event of a leakage.

Such a device is known from U.S. Pat. No. 3,977,233 and German patent DE 24 31 907 C3. It is used as a leakage detection and location system (LDLS, LEOS), for example, on a pipeline (for example, for gas or petroleum). If a substance emerges from a leak in the pipeline, this substance passes as a result of diffusion into the collecting line and is later delivered together with a transport medium, by means of the pump, through the collecting line to a sensor and detected there. The location of the leak is then determined from the transport time and the known flow velocity.

With an increasing length of the collecting line, which in the case of pipelines may amount to 800 km (~500 miles), the problem arises that, because of unavoidable density, pressure and temperature fluctuations of the gaseous transport medium along the collecting line and on account of the high pressure drop necessary for its transport, its flow velocity over the entire collecting line is not constant and may likewise fluctuate. As a result, the accuracy with which the location of the leak can be determined decreases with the length of the collecting line.

SUMMARY OF THE INVENTION

It is accordingly an object of the invention to provide a device for leakage determination and localization which overcomes the above-mentioned disadvantages of the heretofore-known devices and methods of this general type and which is improved in its accuracy of leakage location even in the case of a long collecting line.

With the foregoing and other objects in view there is provided, in accordance with the invention, a device for leakage detection and leakage location, comprising:

a permeable collecting line;

a pump communicating with the collecting line for transporting a transport medium through the collecting line;

at least one first sensor for detecting a substance emerging in the event of a leak;

a plurality of sources of a detectable gas assigned to the collecting line and forming waymarks at predetermined points and at a spacing distance from one another; and a second sensor for the detectable gas assigned in spatial terms to the first sensor for the emerging substance to be detected.

In other words, the objects of the invention are achieved by way of a device having the above features. Since sources of a detectable gas are assigned to the collecting line as waymarks at known points and at a distance from one another and since a sensor for the detectable gas is assigned in spatial terms to the sensor for the emerging substance, an accurate location of a leak is possible even when the flow velocity of the transport medium in the collecting line is not known. It is sufficient, instead, for the locations at which the detectable gas passes into the collecting line to be known accurately. In a sensor, the arriving maximums of the detectable gas serve as waymarks which are to be assigned to a defined location on the collecting line. If, for example, a maximum of a substance occurs between the second and the third maximum of the gas, it is found that the substance has passed into the collecting line between the second and the third source of the detectable gas. Since the locations of these sources are accurately documented and, furthermore, the distance of the leakage location from the corresponding source location can be inferred from the distance of the substance maximum from the adjacent gas maximum, reliable leakage location is afforded.

In principle, it is possible to use one and the same sensor for detecting both the substance and the gas. In this case, the detectable substance and the gas may be identical. Preferably, however, a detectable gas is provided which does not correspond to a substance emerging in the event of a leakage, wherein case, in a particularly preferred embodiment, the use of a sensor for the emerging substance, which does not record the gas, is provided. As a result, even leakages which are in the immediate vicinity of the waymarks can be detected reliably and with high detection sensitivity.

In a particularly preferred embodiment of the invention, the sensor for the emerging substance is preceded by a catalyst for the conversion of hydrogen into water to which the sensor is insensitive. This ensures that the measurement signal received from the sensor for the substance emerging from a leak is not disturbed by hydrogen. Specific sensors are then present for detecting the hydrogen itself.

In particular, the waymarks are sacrificial anodes which are sources of hydrogen. Such sacrificial anodes are mounted on a pipeline in exactly known positions, in order to prevent corrosion of the pipeline. The sacrificial anodes consist, as a rule, of aluminum and are in electrical contact with the pipeline and form with the latter a local element, at the negative pole (cathode), of which, that is to say the pipeline, hydrogen occurs. The latter then passes as detectable gas into the collecting line at exactly known locations.

In an alternative embodiment, the waymarks comprise metal bodies which consist of a more precious metal than the sacrificial anodes and which are connected electrically to these. An independent local element is thereby formed. As a result, the generation of hydrogen at a sacrificial anode or, in the case of a collecting line laid under water, at a metal body connected to the sacrificial anode is ensured continuously and reliably.

The metal body, which acts as a cathode, is electrically insulated from the sacrificial anode, for example by plastic, and is connected to the sacrificial anode by means of an electrical line.

The pump provided is preferably a pressure pump which is connected to the start of the collecting line in the direction of flow. This has the advantage, in relation to the use of a suction pump, that it is possible to build up along the collecting line a high pressure difference which exceeds by a multiple the maximum pressure difference capable of being achieved by means of a suction pump, so that the system can be used over distances of more than 15 km (~9 miles), without a plurality of systems having to be arranged one behind the other. Such a high pressure difference can be generated in the collecting line, using a pressure pump, that there is still a sufficient flow of the transport medium even after several 100 km. Thus, by the use of a pressure pump, the transport medium can be transported reliably over a very great distance, without additional pumps being necessary. This allows use on a pipeline which is laid underwater over great distances (up to 800 km), since, in this case, a high-outlay station for the pump is necessary only at the start or at the end of the collecting line.

In a further advantageous embodiment, a plurality of sensor units placed at a distance from one another for the emerging substance and for the gas are assigned to the collecting line, all the sensor units being connected to an evaluation unit at the end of the collecting line via an electrical supply and measurement line.

Since the collecting line is assigned a plurality of sensor units, this achieves the advantage that the diffused-in substance is detected more rapidly than would be possible in the case of a very long transport as far as the end of the collecting line. Furthermore, after a very long transport of the substance, the latter could be distributed over a longer pipeline segment than during penetration and detection could thereby be impeded. The individual sensor units require only one electrical supply and measurement line in order to transmit the measured values to a central evaluation unit at the end of the collecting line. There, each segment portion between the pump and the first sensor unit, between two adjacent sensor units or between the last sensor unit of the collecting line and an additional sensor unit can then be considered separately in the evaluation unit.

The distance between the sensor units may be between 10 km and 50 km, while the length of the entire collecting line may be between 400 km and 800 km.

The device according to the invention affords the advantage that the leakage detection and location system (LDLS, generally referred to with its German acronym LEOS), known as such, can be used even over very great distances, for example up to 800 km, and also on an underwater pipeline.

Other features which are considered as characteristic for the invention are set forth in the appended claims.

Although the invention is illustrated and described herein as embodied in a device for leakage detection and leakage location, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 1 is a basic diagrammatic illustration of a device according to the invention;

FIG. 2 is a diagram illustrating an further embodiment of the invention; and

FIG. 3 is a partly sectional, diagrammatic view of a yet a further advantageous embodiment of the invention.

DESCRIPTION OF THE PREFERRED EMBODIMENTS

Referring now to the figures of the drawing in detail and first, particularly, to FIG. 1 thereof, there is shown a collecting line 1 that is approximately 500 km (~300 miles) long. The line assembly is provided with a plurality of sensor units 4, for a leakage detection and location system, known as such. The collecting line 1 starts from a pump 2, operating as a pressure pump, and ends at an evaluation unit 3, wherein a last sensor unit 4 is located. The remaining sensor units 4 are assigned at a distance from one another to the collecting line 1. Each sensor unit 4 comprises a sensor 4a for a substance M emerging in the event of a leak. If the substance M emerges at a leak 51 from an adjacent pipeline 5 arranged under water together with the collecting line, the substance M arrives at the collecting line 1, diffuses into the latter and, during a subsequent pumping operation, is transported, together with a transport medium T or carrier medium flowing in the collecting line 1, to the next sensor unit 4 and it is recorded there. The sensor units 4 are all connected via an electrical supply and measurement line 6 to the evaluation unit 3 where the leakage location is then determined, i.e., the leak is localized.

In order not to require the flow velocity in the very long collecting line 1 to be known for the calculation of the leakage location, sources 7 of a detectable gas G, in particular hydrogen, which serve as waymarks, are arranged at known points. These sources consist, in the exemplary embodiment, of sacrificial anodes 8 which are normally disposed on underwater pipelines 5. In the vicinity of these sacrificial anodes 8, hydrogen is formed, which passes as detectable gas G into the collecting line 1 in exactly the same way as the substance M to be detected, which has emerged from the pipeline 5, and is detected by means of the sensor unit 4. For this purpose, each sensor unit 4 contains a specific sensor 4b, assigned to the sensor 4a, for the detectable gas, in the example a hydrogen sensor. In other words, a sensor 4a for the gas G is assigned in spatial terms to each sensor 4a for the substance M. Since the locations of the hydrogen sources, to be precise the locations of the sacrificial anodes 8, are known, the leakage location can be inferred from the position of a maximum for a substance M which has emerged from a leak, between two hydrogen maxima. This can be done, therefore, without requiring the flow velocity in the collecting line 1 to be known.

To improve the sacrificial anodes 8 serving as waymarks, metal bodies 10 are provided, which consist of a more precious metal than the sacrificial anodes 8, are insulated electrically from these by a plastic and are connected to the sacrificial anode 8 via an electrical line 7. Markedly more hydrogen is generated at these metal bodies 10 than at the sacrificial anodes 8 themselves.

So that the sensors 4a for the emerging substance M are not disturbed by the hydrogen that is measured by the sensors 4b, preceding catalysts 9 are provided which convert the hydrogen into water which does not cause any disturbance.

The advantage that leakage locations even in a very long, otherwise inaccessible pipeline 5 can be determined reliably is achieved.

According to FIGS. 2 and 3, the sources 7 of a detectable gas G which serve as waymarks may also be arranged directly on the collecting line 1 and also be arranged annularly around the latter, as illustrated in FIG. 3. These sources are vessels which contain a liquid L, for example a hydrocarbon compound with a low steam pressure, in particular ethanol or a mixture of ethanol and water, the gaseous component G of which diffuses into the collecting line 1. Alternatively, it is also possible to use water as a liquid and to arrange a base metal 12 (FIG. 3), for example a wire consisting of zinc Zn, in the vessel. The hydrogen which then occurs is sufficient to be capable of being detected as a waymark with the aid of the sensor 4b. The embodiments illustrated in FIGS. 2 and 3 in this case no longer require the presence of water in the vicinity of the collecting line 1 or of the pipeline to be monitored, since the generation of the detectable gas is independent of the medium surrounding the collecting line 1 or the pipeline.

I claim:

1. A device for leakage detection and leakage location, comprising:
    a permeable collecting line;
    a pump communicating with said collecting line for transporting a transport medium through said collecting line;
    at least one first sensor assigned to said collecting line for detecting a substance emerging in the event of a leak;
    a plurality of sources generating a detectable gas, said plurality of sources being assigned to said collecting line and forming waymarks at predetermined points and at a spacing distance from one another; and
    a second sensor for the detectable gas assigned in spatial terms to said first sensor for the emerging substance to be detected.

2. The device according to claim 1, wherein said sources provide a gas not corresponding to the substance to be detected and emerging in the event of a leak.

3. The device according to claim 2, wherein the detectable gas is hydrogen.

4. The device according to claim 1, wherein said first sensor for the emerging substance is insensitive to the detectable gas.

5. The device according to claim 4, which comprises a catalytic converter for converting hydrogen into water disposed upstream of said first sensor for the emerging substance.

6. The device according to claim 1, wherein said sources are sacrificial anodes disposed on a pipeline adjacent said collecting line.

7. The device according to claim 6, wherein said sources include metal bodies formed of a more precious metal than said sacrificial anodes and electrically connected to said sacrificial anodes.

8. The device according to claim 1, wherein said pump is connected as a pressure pump at a start of said collecting line.

9. The device according to claim 1, which further comprises an evaluation unit at an end of said collecting line, and wherein said first and second sensors are disposed in a plurality of mutually spaced-apart sensor units assigned to said collecting line and detecting the emerging substance and the gas, and an electrical supply and measurement line connects all of said sensor units to said evaluation unit.

10. The device according to claim 9, wherein each said sensor unit includes a first sensor for the emerging substance and a second sensor for the detectable gas.

* * * * *